(12) United States Patent
Cao et al.

(10) Patent No.: US 12,088,895 B2
(45) Date of Patent: Sep. 10, 2024

(54) PHOTOGRAPHING DEVICE AND ELECTRONIC DEVICE INCLUDING THE SAME

(71) Applicant: TRIPLE WIN TECHNOLOGY(SHENZHEN) CO.LTD., Shenzhen (CN)

(72) Inventors: Cong Cao, Jin Cheng (CN); Jing-Wei Li, Guangdong (CN); Shuai-Peng Li, Shenzhen (CN); Zhuang-Zhuang Jing, Tianjin (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 142 days.

(21) Appl. No.: 18/072,579

(22) Filed: Nov. 30, 2022

(65) Prior Publication Data

US 2024/0073497 A1     Feb. 29, 2024

(30) Foreign Application Priority Data

Aug. 29, 2022   (CN) .......................... 202211050451.7

(51) Int. Cl.
| | |
|---|---|
| *H04N 23/51* | (2023.01) |
| *G03B 17/02* | (2021.01) |
| *G03B 17/56* | (2021.01) |
| *H04N 23/55* | (2023.01) |
| *H04N 23/57* | (2023.01) |

(52) U.S. Cl.
CPC ............. *H04N 23/51* (2023.01); *G03B 17/02* (2013.01); *H04N 23/55* (2023.01)

(58) Field of Classification Search
CPC ........ H04N 23/51; H04N 23/55; H04N 23/57; G03B 17/02; G03B 17/565; G03B 2205/003
See application file for complete search history.

(56) References Cited

U.S. PATENT DOCUMENTS

| | | | |
|---|---|---|---|
| 2011/0170848 A1* | 7/2011 | Chang | ..................... H04N 23/45 396/322 |
| 2012/0182458 A1* | 7/2012 | Ishii | ....................... G03B 17/17 348/340 |
| 2017/0131529 A1* | 5/2017 | Lu | ......................... G02B 7/1805 |
| 2022/0187513 A1* | 6/2022 | Tseng | ....................... G03B 5/04 |

(Continued)

*Primary Examiner* — Marly S Camargo
(74) *Attorney, Agent, or Firm* — ScienBiziP, P.C.

(57) ABSTRACT

A photographing device able to not requiring installation and space in a non-display area of an electronic device includes a base, a prism mechanism, and a photosensitive mechanism. The base includes a receiving groove, and inclined first and second stop surfaces. The prism mechanism is rotatably coupled to the base, accommodated in the receiving groove, and includes incident and light-emitting surfaces at right angles. The first and second stop surfaces are in the rotation path of the light emitting surface. The photosensitive mechanism includes a photosensitive surface parallel to the first stop surface. When the light emitting surface resists against the first stop surface, the light emitting surface faces the photosensitive surface, and at least part of the incident surface is located outside the receiving groove. When the light emitting surface resists against the second stop surface, the incident surface is accommodated in the receiving groove.

20 Claims, 10 Drawing Sheets

(56) References Cited

U.S. PATENT DOCUMENTS

2022/0342276 A1* 10/2022 Min ................... H04N 23/60
2022/0382140 A1* 12/2022 Yamamoto ......... G03B 21/2073
2023/0384567 A1* 11/2023 Arai ..................... G02B 7/18

* cited by examiner

PHOTOGRAPHING DEVICE AND ELECTRONIC DEVICE INCLUDING THE SAME

FIELD

The subject matter herein generally relates to optical devices, and more particularly to a photographing device capable of increasing a screen-to-body ratio of an electric device and an electronic device including the photographing device.

BACKGROUND

Electronic devices with a large screen-to-body ratio are preferred for a good visual user-experience. However, in order to install a functioning component such as a camera module, an opening to the exterior must be made in the non-display region of a display screen in the electronic device. This limits the screen-to-body ratio of the electronic device and prevents the ratio being increased.

BRIEF DESCRIPTION OF THE DRAWINGS

Implementations of the present technology will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 1:
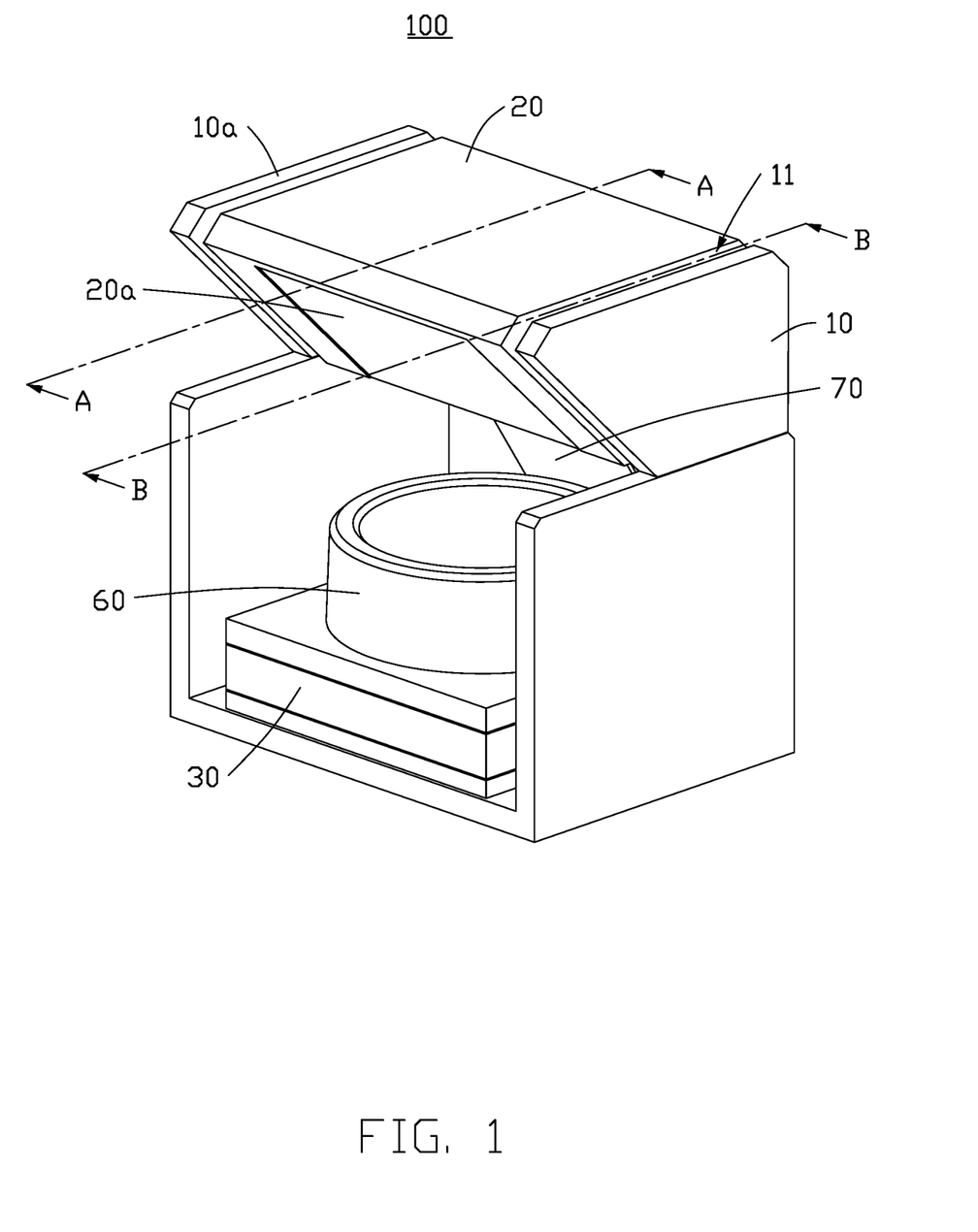
FIG. 1 is a schematic view of a photographing device in a non-photographing state according to an embodiment.
Figure 2:
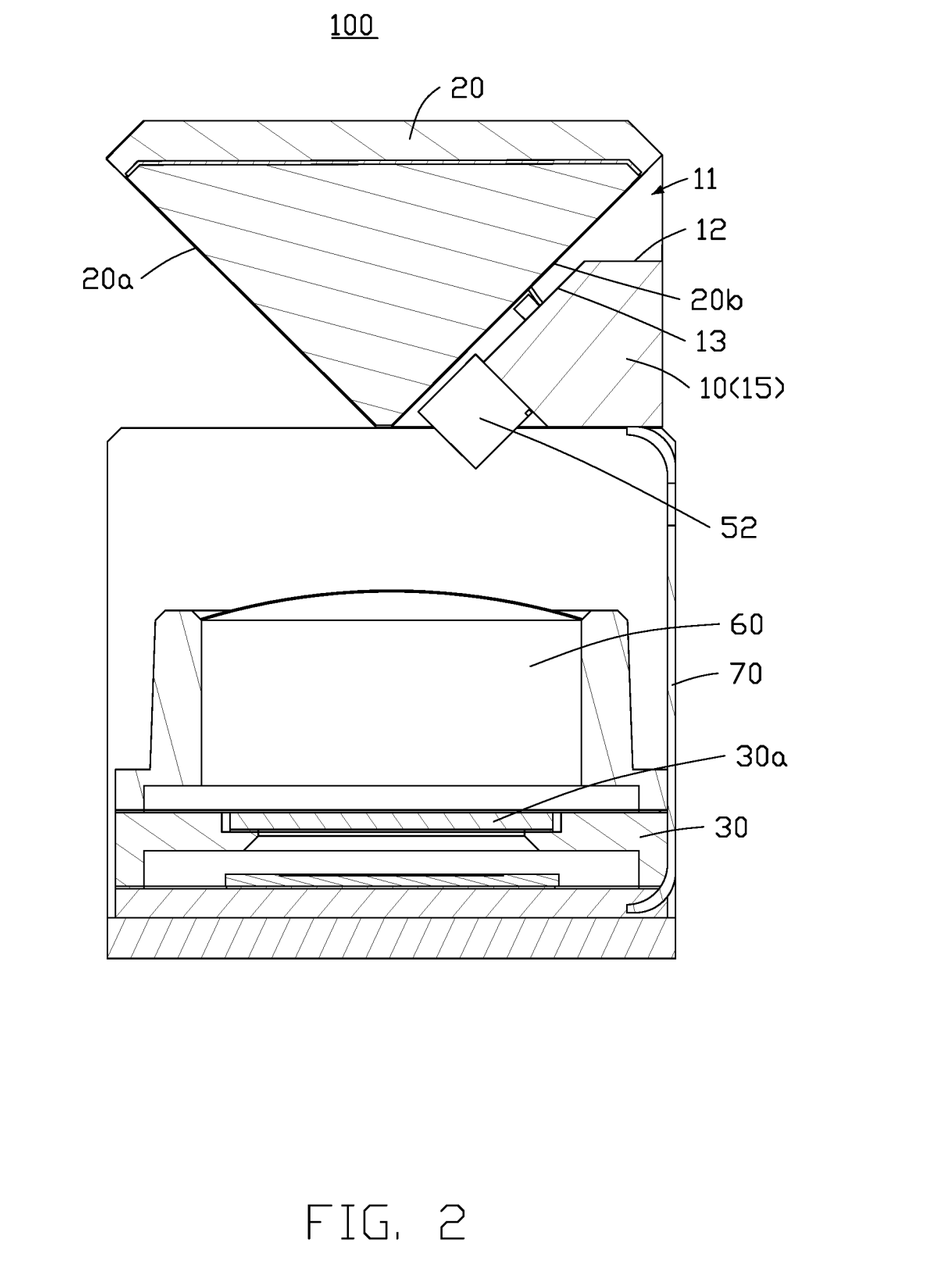
FIG. 2 is a cross-sectional view along line A-A of FIG. 1.
Figure 3:
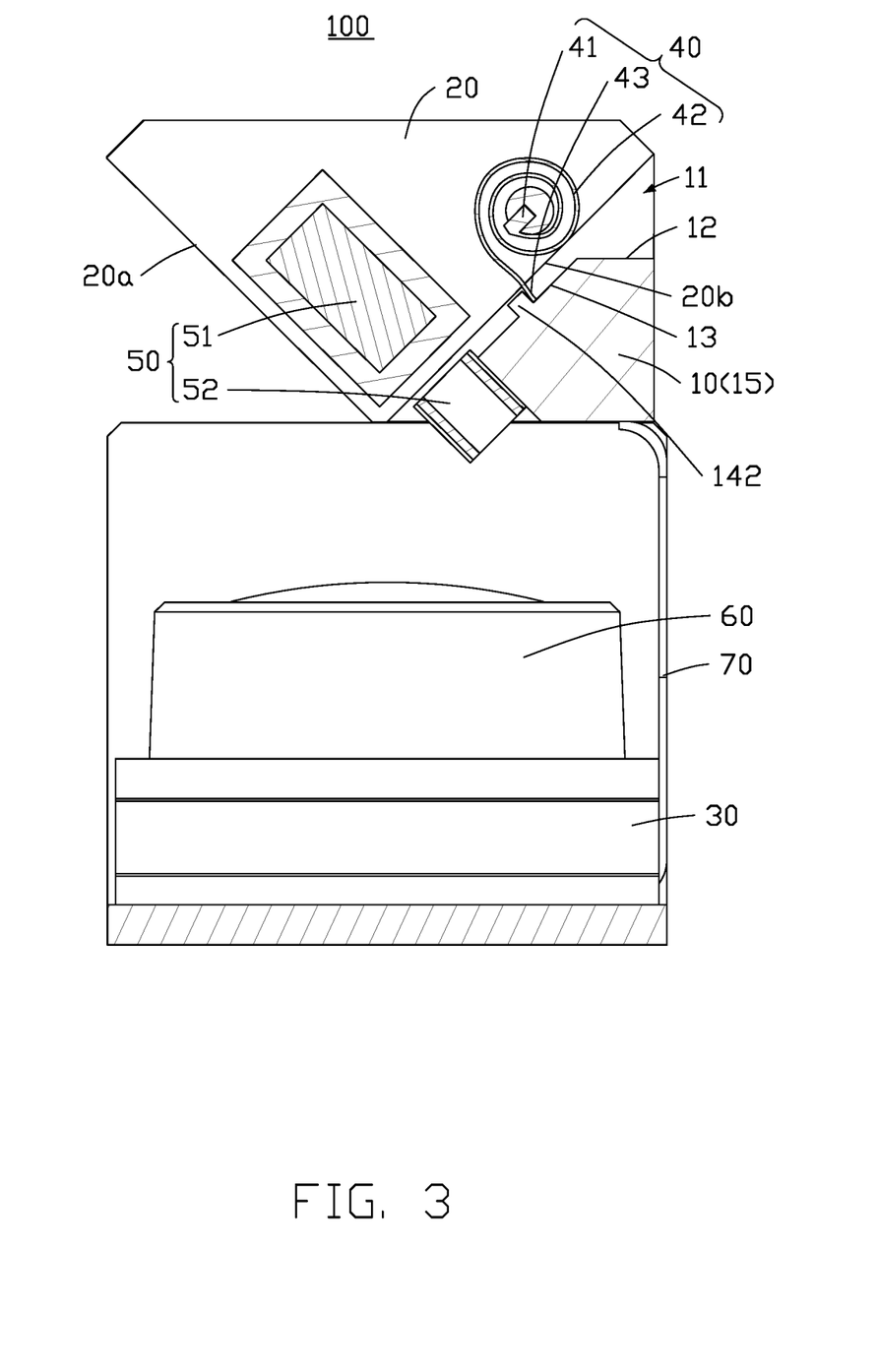
FIG. 3 is a cross-sectional view along line B-B of FIG. 1.

Referring to FIGS. 1, 2, and 3, a photographing device 100 of an embodiment is illustrated. The photographing device 100 includes a base 10, a prism mechanism 20, a photosensitive mechanism 30, an elastic mechanism 40, and a driving mechanism 50. The base 10 includes a receiving groove 11. The prism mechanism 20 is accommodated in the receiving groove 11.

Figure 4:
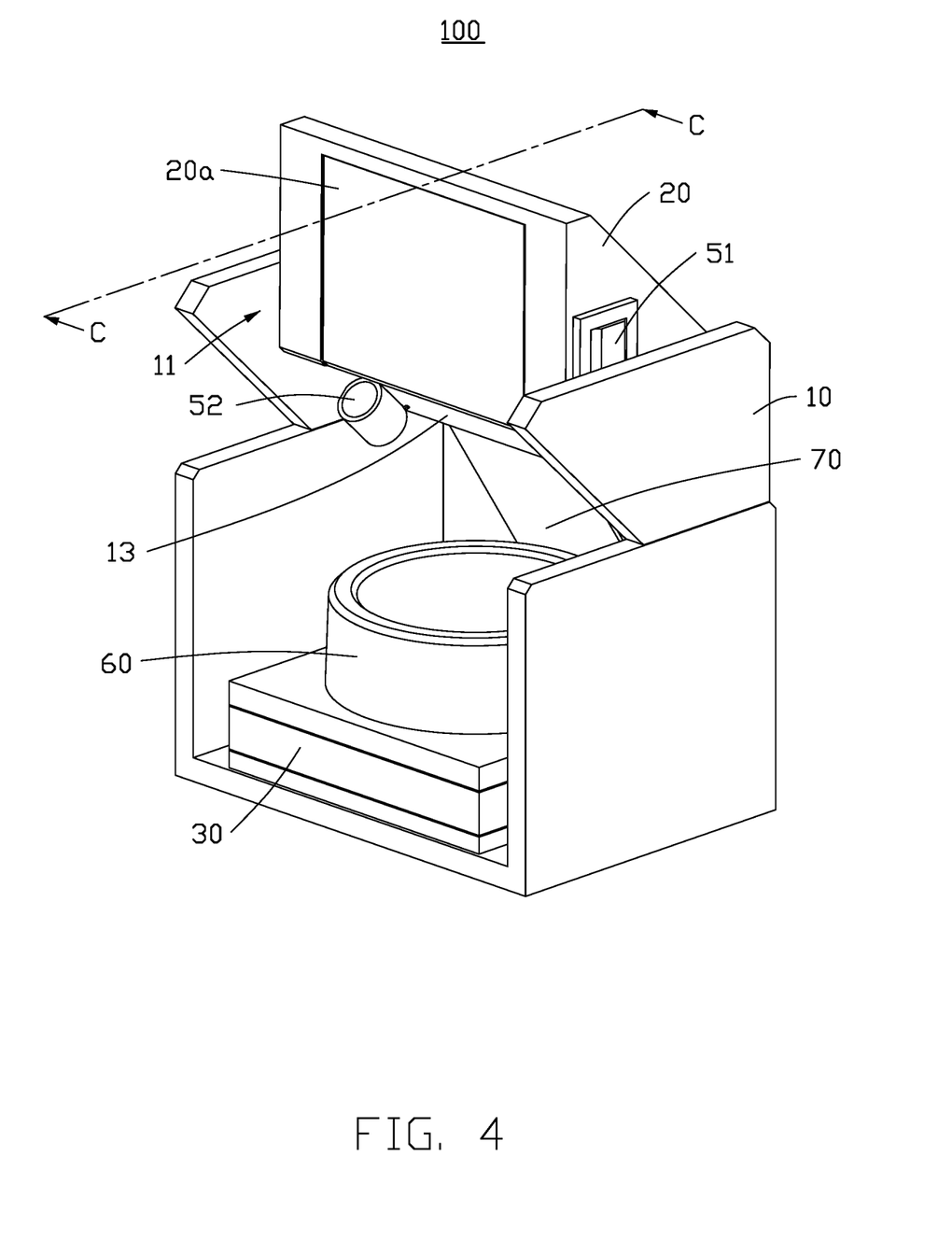
FIG. 4 is a schematic view of the photographing device in a photographing state.

The prism mechanism 20 is rotatably coupled to the base 10. Referring to FIG. 4, when an external force is applied on the prism mechanism 20, the prism mechanism 20 will turn over, causing at least part of the prism mechanism 20 to extend outside the receiving groove 11. The prism mechanism 20 includes an incident surface 20a and a light emitting surface 20b perpendicular to each other. Light incident on the incident surface 20a is internally reflected to the light emitting surface 20b and is emitted from the light emitting surface 20b. The light incident on the incident surface 20a is redirected by the light emitting surface 20b.

The photosensitive mechanism 30 is arranged on a side of the base 10 and is configured to convert optical signals into electrical signals. The photosensitive mechanism 30 includes a photosensitive surface 30a facing the prism mechanism 20, and the photosensitive surface 30a is configured to receive the light transmitted from the prism mechanism 20.

Figure 5:
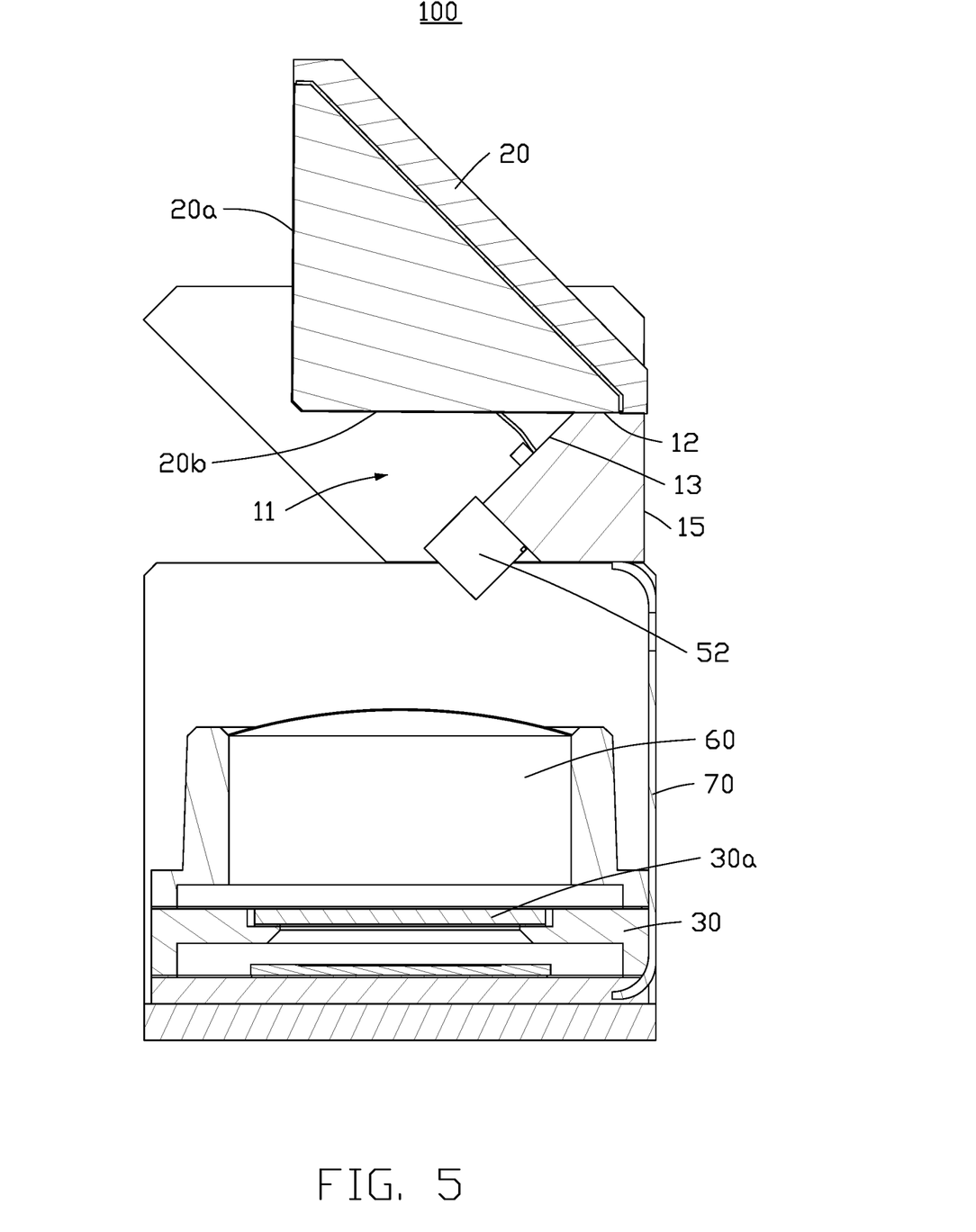
FIG. 5 is a cross-sectional view along line C-C of FIG. 4.

The base 10 includes a first stop surface 12 and a second stop surface 13 arranged in the receiving groove 11. The first stop surface 12 and the second stop surface 13 are located in a rotation path of the light emitting surface 20b and are configured to resist against the light emitting surface 20b to limit a rotation angle of the prism mechanism 20. The first stop surface 12 and the photosensitive surface 30a are parallel and spaced from each other. Referring to FIG. 5, when the light emitting surface 20b abuts against the first stop surface 12, the light emitting surface 20b faces the photosensitive surface 30a, and part of the incident surface 20a is located outside the receiving groove 11, so that exterior light can be gathered by the incident surface 20a. The light transmitted from the light emitting surface 20b is irradiated to the photosensitive surface 30a, realizing the photographing function.

The second stop surface 13 is inclined relative to the first stop surface 12. Referring to FIG. 2, when the light emitting surface 20b resists against the second stop surface 13, the total incident surface 20a is accommodated in the receiving groove 11, reducing space occupied by the prism mechanism 20 when in the non-photographing state (accommodated state).

Referring to FIG. 3, the elastic mechanism 40 is coupled between the base 10 and the prism mechanism 20. The elastic mechanism 40 is configured to apply an elastic force on the prism mechanism 20, to rotate the prism mechanism 20 until the light emitting surface 20b resists against the second stop surface 13. The driving mechanism 50 is coupled between the base 10 and the prism mechanism 20.

The driving mechanism 50 is configured to drive the prism mechanism 20 to overcome the elastic force of the elastic mechanism 40, to rotate the prism mechanism 20 until the light emitting surface 20b resists against the first stop surface 12.

Referring to FIGS. 4 and 5, in the photographing device 100, the first stop surface 12 and the second stop surface 13 resist against the light emitting surface 20b to control the rotation angle of the prism mechanism 20, realizing switching between the photographing state (photographing-ready state) and the non-photographing state of the photographing device 100. Specifically, when the light emitting surface 20b resists against the first stop surface 12, the light emitting surface 20b faces the photosensitive surface 30a and at least part of the incident surface 20a is located outside the receiving groove 11, then the incident surface 20a receives the light located outside the receiving groove 11, then the light transmitted from the light emitting surface 20b is irradiated to the photosensitive surface 30a, the photographing device 100 is thus in the photographing state. When the light emitting surface 20b resists against the second stop surface 13, the total incident surface 20a is accommodated in the receiving groove 11, the photographing device 100 is thus in the non-photographing state, and space occupied by the prism mechanism 20 is saved. The elastic mechanism 40 and the driving mechanism 50 cooperate to drive the prism mechanism 20 to rotate relative to the base 10, to automatically switch between the two states of the photographing device 100.

When the photographing device 100 is applied to an electronic device, such as a mobile phone, the photographing device 100 can be coupled to a side edge of a housing of the electronic device, and the elastic mechanism 40 and the driving mechanism 50 cooperate to drive the prism mechanism 20 to rotate relative to the base 10, until the prism mechanism 20 is turned over to extend outside of the housing of the electronic device, allowing the photographing device 100 to take photographs; if the prism mechanism 20 is turned over to be accommodated in the housing of the electronic device, the photographing device 100 is not ready to take photographs. Thus a non-display area on a screen of the electronic device does not need to be reserved or utilized, and the screen-to-body ratio of the electronic device is increased.

In some embodiments, the second stop surface 13 is inclined at an angle of 45 degrees relative to the first stop surface 12, so that a rotation range of the prism mechanism 20 is 45 degrees. Specifically, when the light emitting surface 20b resists against the second stop surface 13, the junction of the incident surface 20a and the light emitting surface 20b faces the photosensitive surface 30a. After the prism mechanism 20 is rotated 45 degrees, the light emitting surface 20b resists against the first stop surface 12, the incident surface 20a is perpendicular to the photosensitive surface 30a, and the light emitting surface 20b is parallel to the photosensitive surface 30a, so that the light transmitted from the light emitting surface 20a is turned 90 degrees and is emitted from the light emitting surface 20b to the photosensitive surface 30a.

Figure 6:
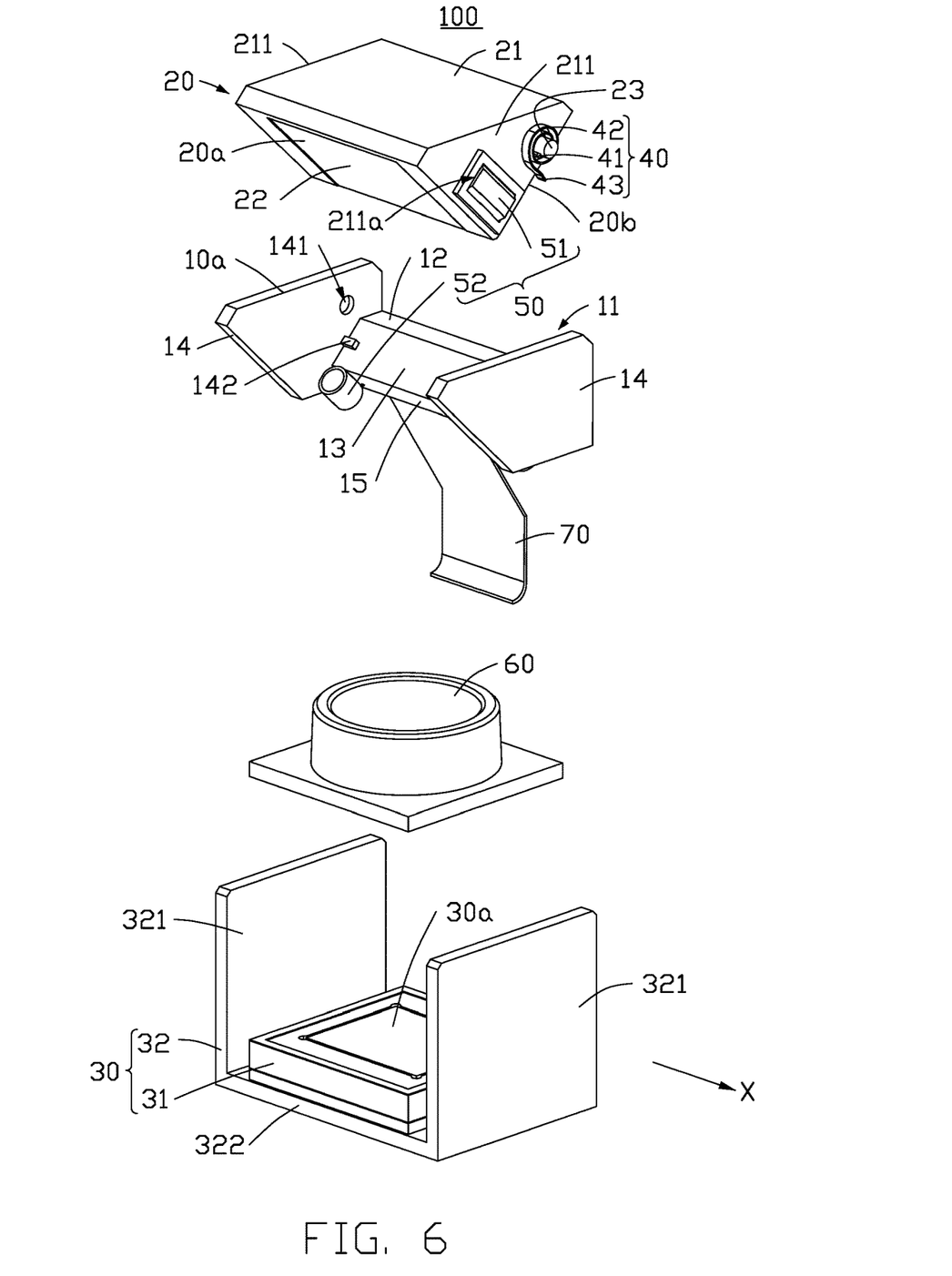
FIG. 6 is an exploded view of a photographing device according to another embodiment.

Referring to FIG. 6, in some embodiments, the base 10 includes two support plates 14 which are spaced in a first direction X, and a stop block 15 coupled between the two support plates 14. The receiving groove 11 is formed between two support plates 14. The prism mechanism 20 is rotatably coupled to the two support plates 14. The prism mechanism 20 rotates around the first direction X. The stop block 15 is located in the rotation path of the prism mechanism 20, and the first stop surface 12 and the second stop surface 13 are two surfaces of the stop block 15 located in the receiving groove 11.

Optionally, the first stop surface 12 and the second stop surface 13 are contiguous. In other embodiments, the first stop surface 12 and the second stop surface 13 are spaced.

In some embodiments, the two support plates 14 and the stop block 15 are formed as an integral unit, improving the structural strength of the base 10.

Referring to FIG. 6, in some embodiments, the prism mechanism 20 includes a bracket 21, a prism 22, and two rotating shafts 23. The Prism 22 is fixedly coupled to the bracket 21. The bracket 21 includes two connecting surfaces 211 opposite to each other in the first direction X. Each rotating shaft 23 is fixedly coupled to one corresponding connecting surface 211 and is rotatably coupled to one corresponding support plate 14. The two rotating shafts 23 are coaxial. Specifically, an area of a surface of each support plate 14 facing the connecting surface 211 is recessed to form a connecting groove 141, and an end of one corresponding rotating shaft 23 facing away from the connecting surface 211 extends into the connecting groove 141 and can rotate in the connecting groove 141.

In some embodiments, when viewed along the first direction X, each rotating shaft 23 is close to the light emitting surface 20b and far away from the junction of the incident surface 20a and the light emitting surface 20b, so that the incident surface 20a is far away from the rotating shaft 23. In this way, when the light emitting surface 20b resists against the first stop surface 12, an area of the incident surface 20a outside the receiving groove 11 is increased, an area of the incident surface 20a for receiving light is thus increased when the photographing device 100 is in the photographing state.

Figure 7:
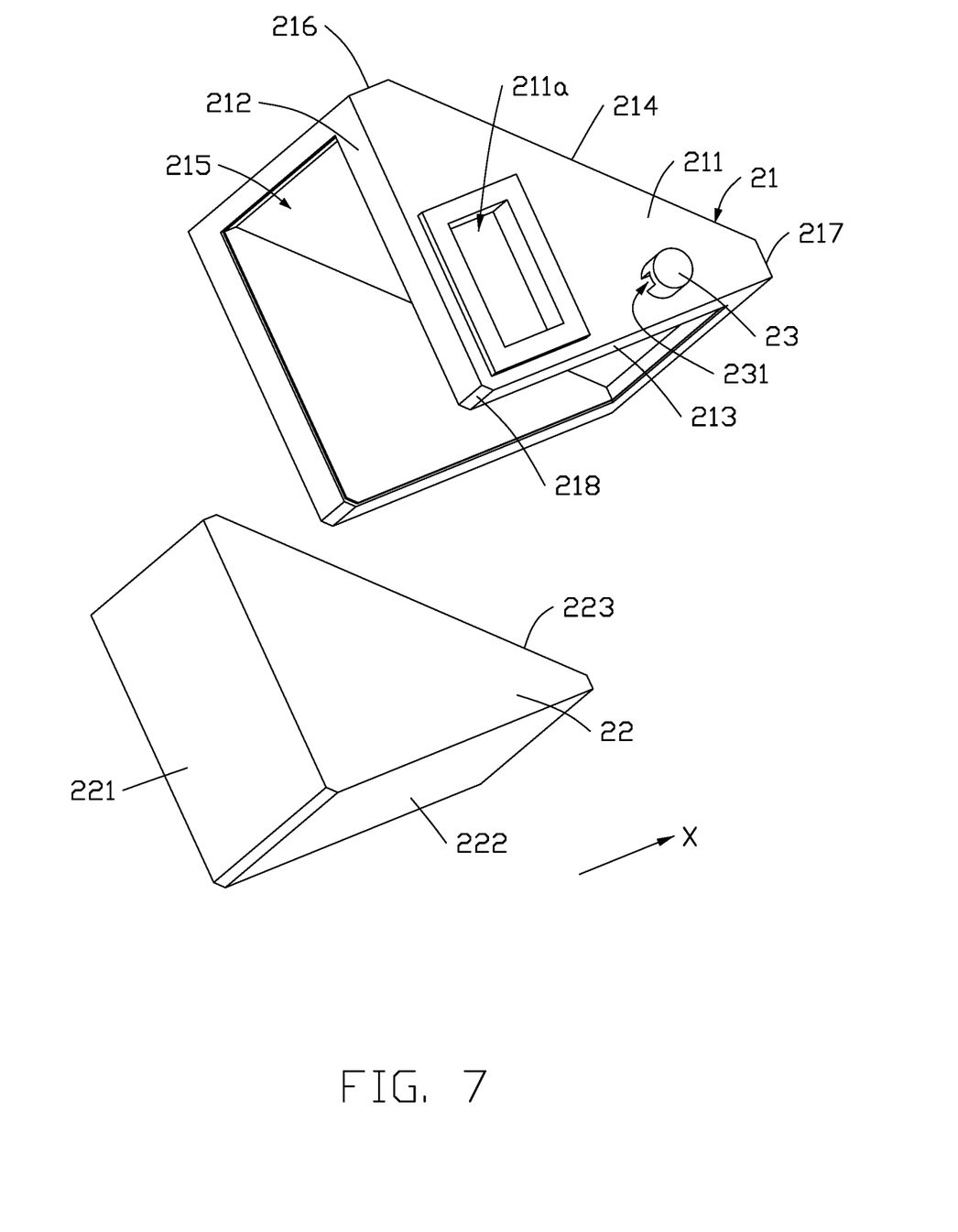
FIG. 7 is a schematic view of a prism mechanism of the photographing device in FIG. 1 or in FIG. 6.

Referring to FIGS. 6 and 7, in some embodiments, the prism 22 is a triangular prism with an isosceles right triangle section. The prism 22 includes an incident surface 21, a light emitting surface 222, and a reflecting surface 223. The incident surface 221 and the light emitting surface 222 are vertical to each other, and the reflecting surface 223 is arranged at an angle of 45 degrees with respect to the incident surface 221 and the light emitting surface 222. The light incident from the incident surface 221 is fully reflected by the reflecting surface 223 to the light emitting surface 22, and then is emitted from the light emitting surface 22, redirecting the light.

In some embodiments, the bracket 21 further includes a first surface 212, a second surface 213, and a third surface 214 which are arranged between the two connecting surfaces 211 and are coupled end to end. The first surface 212 and the second surface 213 are vertical to each other, and the third surface 214 is inclined with respect to the first surface 212 and the second surface 213. Areas of the first surface 212 and the second surface 213 are recessed to form a fixing groove 215, and the prism 22 is fixed in the fixing groove 215. Specifically, the reflecting surface 223 of the prism 22 is accommodated in the fixing groove 215 and is adjacent to the third surface 214. The incident surface 221 of the prism 22 is exposed from the first surface 212 to form the incident surface 20a, and the light emitting surface 222 of the prism 22 is exposed from the second surface 213 to form the light emitting surface 20b.

In some embodiments, the base 10 further includes a top surface 10a far away from the photosensitive mechanism 30. Specifically, surfaces of the two support plates 14 far away from the photosensitive mechanism 30 form the top surface 10a. When the light emitting surface 20b resists against the second stop surface 13, the third surface 214 is flush with the top surface 10a, saving space occupied by the prism mechanism 20 when in the non-photographing state.

In some embodiments, the bracket 21 further includes a first chamfer surface 216, a second chamfer surface 217, and a third chamfer surface 218. The first chamfer surface 216 is coupled between the first surface 212 and the third surface 214, the second chamfer surface 217 is coupled between the second surface 213 and the third surface 214, and the third chamfer surface 218 is coupled between the first surface 212 and the second surface 213. The first chamfer 216, the second chamfer 217, and the third chamfer 218 reduce risk of jamming or being stuck when the bracket 21 rotates and reduce risk of the bracket 21 scratching other structures.

Referring to FIG. 6, in some embodiments, the photosensitive mechanism 30 includes an image sensor 31 and a carrier 32. The image sensor 31 is configured to convert the optical signals into the electrical signals, and the photosensitive surface 30a is a surface of the image sensor 31 facing the prism mechanism 20. The carrier 32 includes two side plates 321 which are spaced in the first direction X, and a bottom plate 322 coupled between the two side plates 321. The bottom plate 322 faces the prism mechanism 20 and is configured for supporting the image sensor 31. The two side plates 321 are configured to limit a position of the photosensitive chip 31, to improve stability of the image sensor 31 and the prism mechanism 20.

In some embodiments, the side plates 321 and the support plates 14 are connected one-to-one, to further improve the stability of the image sensor 31 and the prism mechanism 20.

Referring to FIGS. 6 and 7, in some embodiments, the elastic mechanism 40 includes a first connecting block 41, an elastic arm 42, and a second connecting block 43 connected in turn. The elastic arm 42 extends in a spiral shape, the first connecting block 41 is fixedly coupled to the prism mechanism 20, and the second connecting block 43 is fixedly coupled to the base 10. The elastic arm 42 is configured to apply an elastic force to the prism mechanism 20, so that the light emitting surface 20b is moved to resist against the second stop surface 13.

Specifically, a side wall of the rotating shaft 23 defines a limiting groove 231 radially recessed, and the first connecting block 41 is clamped and fixed in the limiting groove 231. A fixing block 142 protrudes from a surface of each support plate 14 facing the prism mechanism 20. The fixing block 142 is close to the second stop surface 13, and the second connecting block 43 is fixedly coupled to the fixing block 142. When the external force is applied, the prism mechanism 20 is rotated, and the elastic arm 42 is deformed by rotating with the rotating shaft 23. When the external force is released, the elastic arm 42 rebounds to rotate the rotating shaft 23 to the original position.

Referring to FIGS. 6 and 7, in some embodiments, the driving mechanism 50 includes a magnet 51 and a drive coil 52. The magnet 51 is coupled to one of the base 10 and the prism mechanism 20, and the drive coil 52 is coupled to the other of the base 10 and the prism mechanism 20. The drive coil 52 cooperates with the magnet 51 to drive the prism mechanism 20 to rotate relative to the base 10. When the drive coil 52 is electrically energized, the drive coil 52 interacts with the magnet 51 enabling rotation of the prism mechanism 20.

Optionally, the magnet 51 is coupled to the base 10, and the drive coil 52 is coupled to the prism mechanism 20. In other embodiments, the magnet 51 is coupled to the prism mechanism 20, and the drive coil 52 is coupled to the base 10.

Specifically, in some embodiments, an area of a surface of the connecting surface 211 is recessed to form a mounting groove 211a. The magnet 51 is received in the mounting groove 211a, improving strength of connection between the magnet 51 and the bracket 21, and reducing the space occupied by the driving mechanism 50. The drive coil 52 is electrically coupled to the stop block 15. The stop block 15 is made of conductive materials, and is configured to electrically connect to a power supply to energize the drive coil 52. The drive coil 52 is electrically coupled to the stop block 15, simplifying circuit structure of the drive coil 52, facilitating miniaturization of the driving mechanism 50, and further facilitating the miniaturization of the photographing device 100.

In some embodiments, there are two elastic mechanisms 40 and two driving mechanisms 50, each elastic mechanism 40 and one driving mechanism 50 are arranged between one connecting surface 211 and one support plate 14, improving the rotational stability of prism mechanism 20.

Referring to FIG. 6, in some embodiments, the photographing device 100 further includes a lens mechanism 60. The lens mechanism 60 is arranged between the photosensitive mechanism 30 and the prism mechanism 20. The light emitted from the light emitting surface 20b is transmitted through the lens mechanism 60 and onto the photosensitive surface 30a. The lens mechanism 60 is configured to achieve different optical effects.

Optionally, the lens mechanism 60 is a wide-angle lens, a standard lens, or a telephoto lens.

Figure 8:
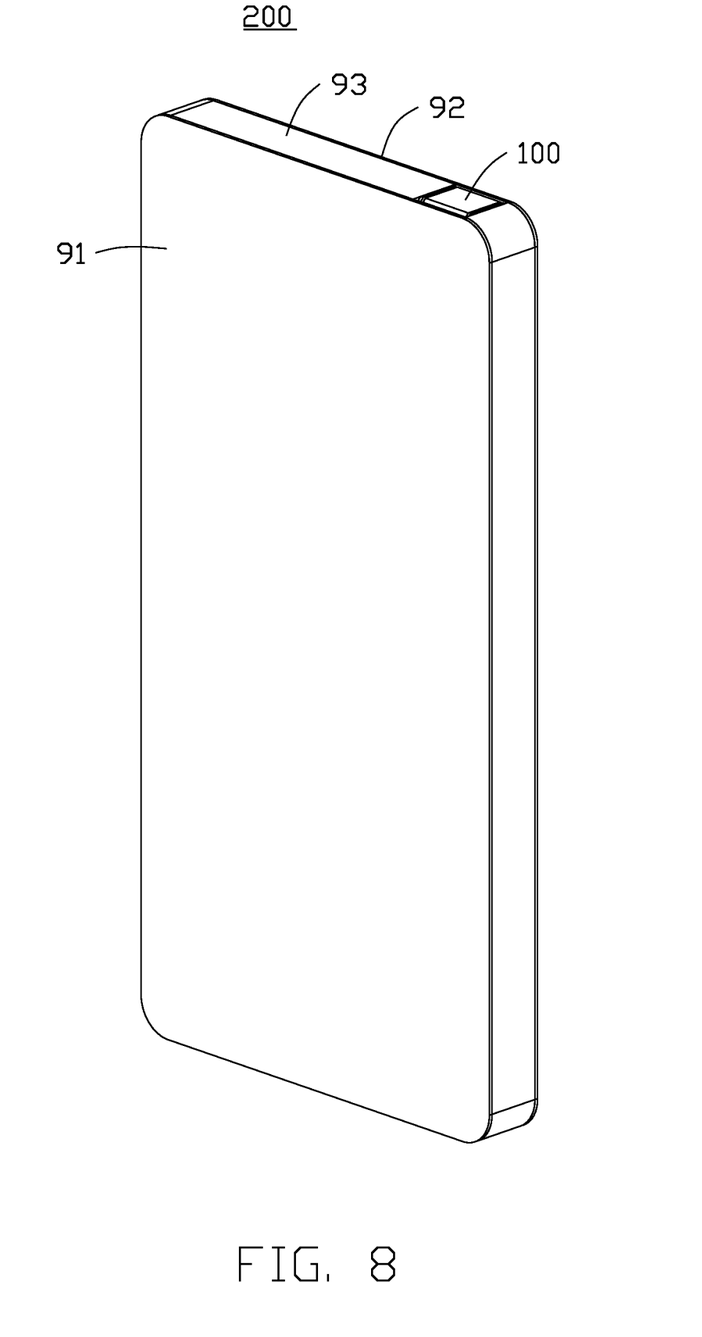
FIG. 8 is a schematic view of an electronic device in a non-photographing state according to an embodiment.
Figure 9:
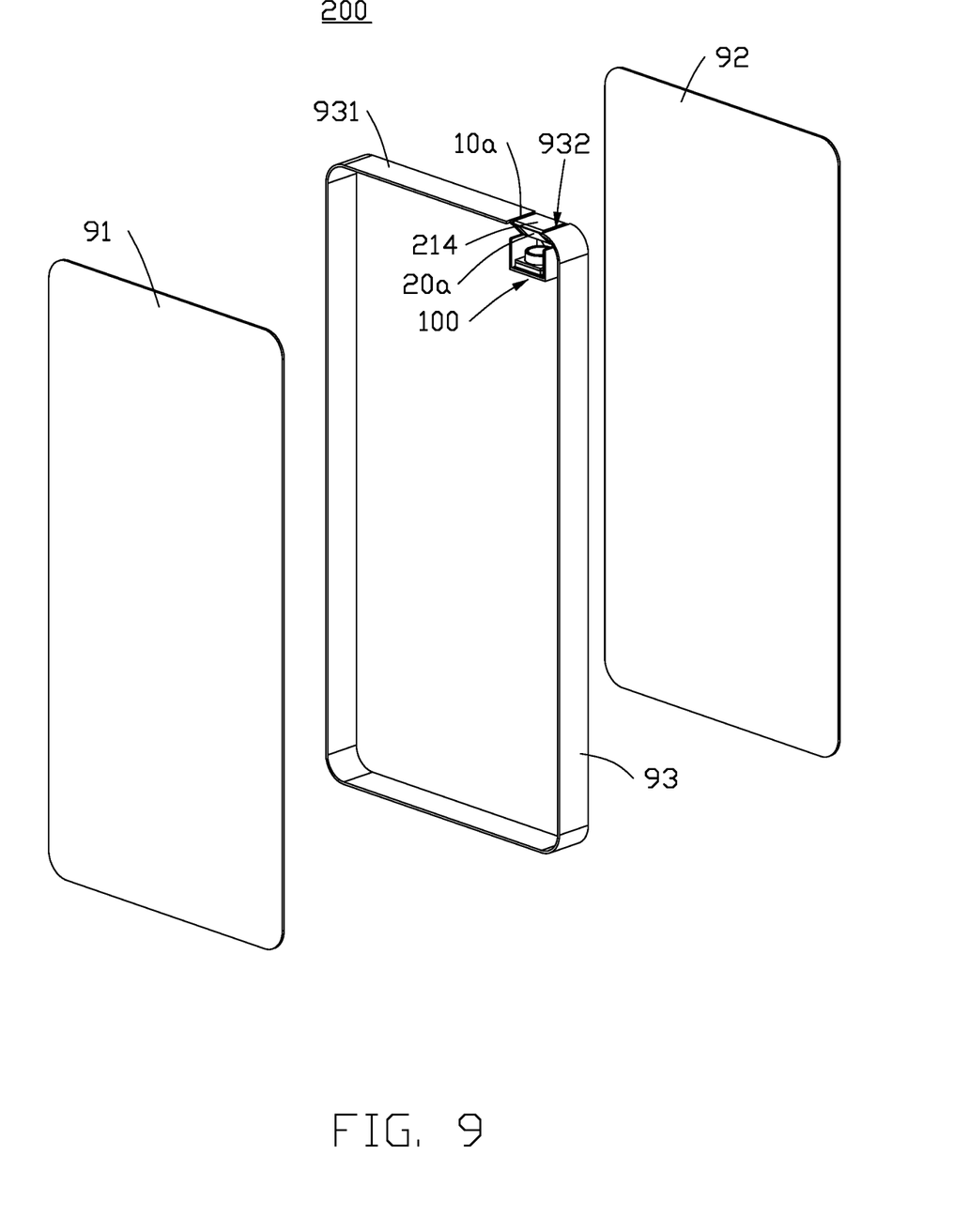
FIG. 9 is an exploded view of the electronic device of FIG. 8.
Figure 10:
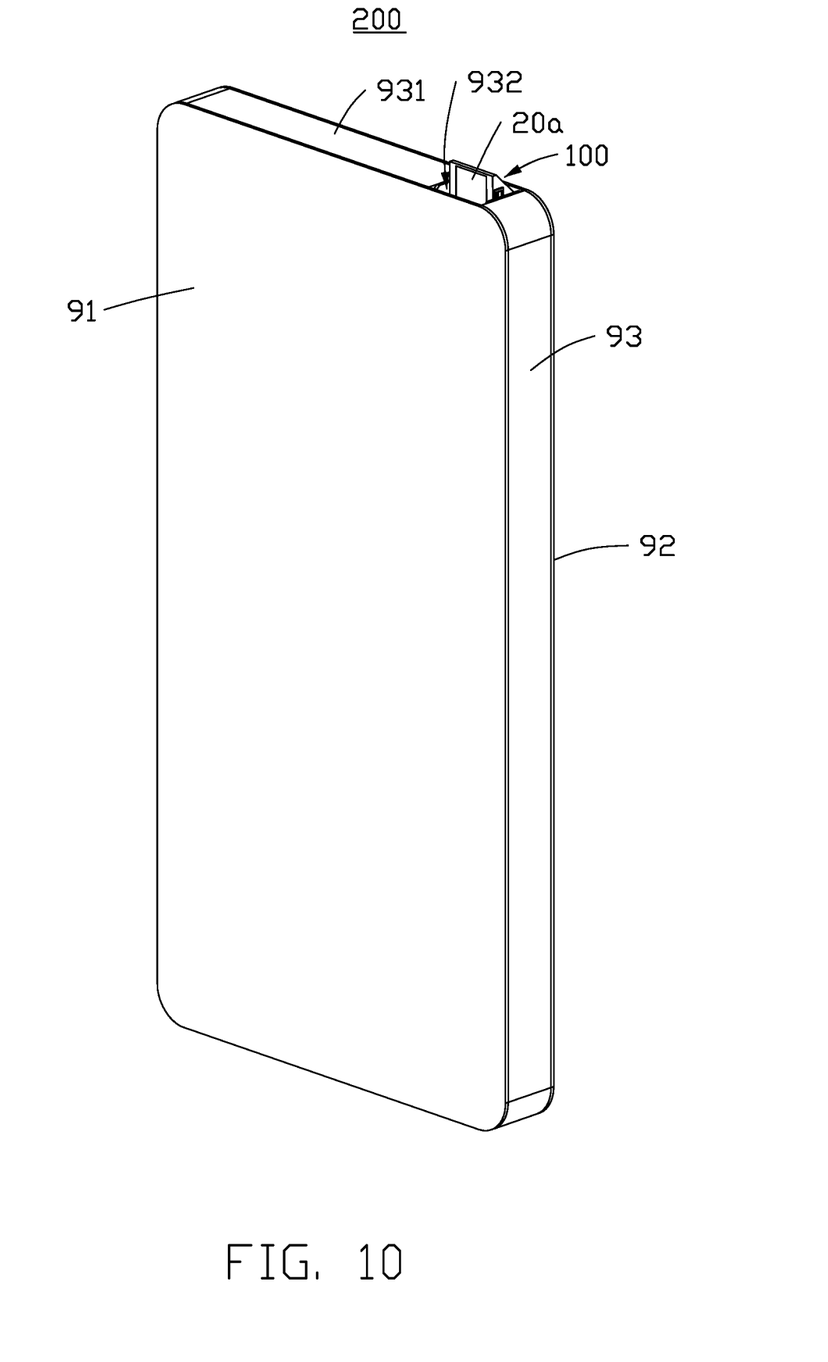
FIG. 10 is a schematic view of the electronic device in a photographing state.

Referring to FIGS. 8, 9, and 10, an embodiment of an electronic device 200 is illustrated. The electronic device 200 includes a face plate 91, a rear plate 92 opposite to the face plate 91, and a middle frame 93 coupled between the face plate 91 and the rear plate 92. The surface of this face plate 105 is the screen on which an image is displayed. The face plate 91, the rear plate 92, and the middle frame 93 cooperatively enclose a receiving space 90 for receiving a main board, a battery, and other components. The electronic device 200 further includes the photographing device 100. The photographing device 100 includes the prism mechanism 20 and the photosensitive mechanism 30. The prism mechanism 20 is rotatably installed in the receiving space 90 and is exposed from the middle frame 93. The photosensitive mechanism 30 is arranged in the receiving space 90 and includes the photosensitive surface 30a facing the prism mechanism 20. When in the photographing state, the prism mechanism 20 turns over, causing at least part of the prim mechanism 20 to extend outside the receiving space 90, to gather light for the photosensitive surface 30a. When in the non-photographing state, the total prism mechanism 20 is accommodated in the receiving space 90. In this way, the non-display area on the screen of electronic device is not utilized, the screen-to-body ratio of the electronic device is improved.

Referring to FIGS. 9 and 10, the base 10 is fixedly coupled to the middle frame 93. When the light emitting surface 20b resists against the first stop surface 12, the incident surface 20a is at least partially located outside the receiving space 90, the electronic device 200 being in the photographing state. When the light emitting surface 20b resists against the second stop surface 13, the incident surface 20a is accommodated in the receiving space 90, the electronic device 200 being in the non-photographing state.

In some embodiments, the part of the middle frame 93 connecting the base 10 includes an outer side face 931 and an opening 932 penetrating the outer side face 931. The prism mechanism 20 is exposed by the opening 932. The outer side face 931 is flush with the top surface 10a. When the light emitting surface 20b resists against the second stop surface 13, the third surface 214, the top surface 10a, and the outer side face 931 are flush with each other, reducing space occupied by the photographing device 100 when in the non-photographing state. When the electronic device 200 is in the non-photographing state, the third surface 214 seals the opening 932, reducing the entry of impurities and contaminants into the receiving space 90.

Optionally, the electronic device 200 may be a mobile phone, a tablet, a laptop, or a wearable device.

Using a mobile phone as an example, the photographing device 100 can be used as a front-facing camera and a rear-facing camera of the electronic device 200. When the incident surface 20a of the prism mechanism 20 is turned over towards the face plate 91 and receives light from a side close to the face plate 91, the photographing device 100 can function as a front-facing camera. When the incident surface 20a of the prism mechanism 20 is turned over towards the rear plate 92 and receives light from a side close to the rear plate 92, the photographing device 100 can function as a rear-facing camera.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A photographing device comprising:
    a base comprising a receiving groove, a first stop surface, and a second stop surface, the first stop surface and the second stop surface being located in the receiving groove, the first stop surface being inclined with respect to the second stop surface;
    a prism mechanism rotatably coupled to the base and accommodated in the receiving groove, the prism mechanism comprising an incident surface and a light emitting surface perpendicular to the incident surface, the first stop surface and the second stop surface being located in a rotation path of the light emitting surface of the prism mechanism; and
    a photosensitive mechanism arranged on a side of the base and comprising a photosensitive surface facing the prism mechanism, the photosensitive surface being parallel to and spaced from the first stop surface;
    wherein when the prism mechanism is rotated so that the light emitting surface resists against the first stop surface, the light emitting surface faces the photosensitive surface, and at least part of the incident surface is located outside the receiving groove; and when the prism mechanism is rotated so that the light emitting surface resists against the second stop surface, the incident surface is accommodated in the receiving groove.

2. The photographing device of claim 1, wherein an angle between the first stop surface and the second stop surface is 45 degrees.

3. The photographing device of claim 1, the base further comprising two support plates and a stop block coupled between the two support plates, wherein the two support plates are spaced in a first direction, the receiving groove is formed between the two support plates, the first stop surface and the second stop surface are two surfaces of the stop block in the receiving groove.

4. The photographing device of claim 3, the prism mechanism further comprising a bracket, a prism fixedly coupled to the bracket, and two rotating shafts, wherein the bracket comprises two connecting surfaces opposite to each other in the first direction, each of the two rotating shafts is fixedly coupled to one corresponding connecting surface and is rotatably coupled to one corresponding support plate, the two rotating shafts are coaxial.

5. The photographing device of claim 4, wherein in the first direction, each of the two rotating shaft is closer to the light emitting surface than to the incident surface.

6. The photographing device of claim 4, wherein the bracket further comprises a first surface, a second surface, and a third surface, the first surface, the second surface, and the third surface are arranged between the two connecting surfaces and are coupled end to end, the first surface is perpendicular to the second surface, the third surface is inclined with respect to each of the first surface and the second surface, areas of the first surface and the second surface are concave to form a fixing groove, the prism is fixed in the fixing groove, the incident surface is a surface of the prism exposed from the first surface, and the light emitting surface is a surface of the prism exposed from the second surface.

7. The photographing device of claim 6, the base further comprising a top surface facing away from the photosensitive mechanism, wherein when the light emitting surface resists against the second stop surface, the third surface is parallel to the top surface.

8. The photographing device of claim 1 further comprising:
    an elastic mechanism coupled between the base and the prism mechanism and configured to apply an elastic force on the prism mechanism to rotate the prism mechanism until the light emitting surface resists against the second stop surface; and
    a driving mechanism coupled between the base and the prism mechanism and configured to drive the prism mechanism to rotate until the light emitting surface resists against the first stop surface.

9. The photographing device of claim 8, the elastic mechanism comprising:
    a first connecting block fixedly coupled to the prism mechanism,
    a second connecting block fixedly coupled to the base, and
    an elastic arm coupling the first connecting block with the second connecting block, the elastic arm extending in a spiral shape.

10. The photographing device of claim 8, the driving mechanism comprising a magnet and a drive coil, wherein the magnet is coupled to one of the base and the prism mechanism, and the drive coil is coupled to the other one of the base and the prism mechanism.

11. The photographing device of claim 1, further comprising a lens mechanism arranged between the photosensitive mechanism and the prism mechanism, wherein the lens mechanism transmits light from the light emitting surface to the photosensitive surface.

12. An electronic device comprising:
    a face plate;
    a rear plate opposite to the face plate;

a middle frame coupled between the face plate and the rear plate, the face plate, the rear plate, and the middle frame cooperatively enclosing a receiving space; and a photographing device received in the receiving space and comprising:
   a base comprising a receiving groove, a first stop surface, and a second stop surface, the first stop surface and the second stop surface being located in the receiving groove, the first stop surface being inclined with respect to the second stop surface;
   a prism mechanism rotatably coupled to the base and accommodated in the receiving groove, the prism mechanism comprising an incident surface and a light emitting surface perpendicular to the incident surface, the first stop surface and the second stop surface being located in a rotation path of the light emitting surface of the prism mechanism; and
   a photosensitive mechanism arranged on a side of the base and comprising a photosensitive surface facing the prism mechanism, the photosensitive surface being parallel to and spaced from the first stop surface;

wherein when the prism mechanism is rotated so that the light emitting surface resists against the first stop surface, the light emitting surface faces the photosensitive surface, and at least part of the incident surface is located outside the receiving space; and when the prism mechanism is rotated so that the light emitting surface resists against the second stop surface, the incident surface is accommodated in the receiving space.

13. The electronic device of claim 12, wherein an angle between the first stop surface and the second stop surface is 45 degrees.

14. The electronic device of claim 12, the base further comprising two support plates and a stop block coupled between the two support plates, wherein the two support plates are spaced in a first direction, the receiving groove is formed between the two support plates, the first stop surface and the second stop surface are two surfaces of the stop block in the receiving groove.

15. The electronic device of claim 14, the prism mechanism further comprising a bracket, a prism fixedly coupled to the bracket, and two rotating shafts, wherein the bracket comprises two connecting surfaces opposite to each other in the first direction, each of the two rotating shafts is fixedly coupled to one corresponding connecting surface and is rotatably coupled to one corresponding support plate, the two rotating shafts are coaxial.

16. The electronic device of claim 15, wherein the bracket further comprises a first surface, a second surface, and a third surface, the first surface, the second surface, and the third surface are arranged between the two connecting surfaces and are coupled end to end, the first surface is perpendicular to the second surface, the third surface is inclined with respect to each of the first surface and the second surface, areas of the first surface and the second surface are concave to form a fixing groove, the prism is fixed in the fixing groove, the incident surface is a surface of the prism exposed from the first surface, and the light emitting surface is a surface of the prism exposed from the second surface.

17. The electronic device of claim 16, the base further comprising a top surface facing away from the photosensitive mechanism, wherein when the light emitting surface resists against the second stop surface, the third surface is parallel to the top surface.

18. The electronic device of claim 12, further comprising:
   an elastic mechanism coupled between the base and the prism mechanism and configured to apply an elastic force on the prism mechanism to rotate the prism mechanism until the light emitting surface resists against the second stop surface; and
   a driving mechanism coupled between the base and the prism mechanism and configured to drive the prism mechanism to rotate until the light emitting surface resists against the first stop surface.

19. The electronic device of claim 18, the elastic mechanism comprising:
   a first connecting block fixedly coupled to the prism mechanism,
   a second connecting block fixedly coupled to the base, and
   an elastic arm coupling the first connecting block with the second connecting block, the elastic arm extending in a spiral shape.

20. The electronic device of claim 18, the driving mechanism comprising a magnet and a drive coil, wherein the magnet is coupled to one of the base and the prism mechanism, and the drive coil is coupled to the other one of the base and the prism mechanism.

* * * * *